April 5, 1949. P. C. JURS 2,466,437
TANK GAUGE
Filed Nov. 3, 1945
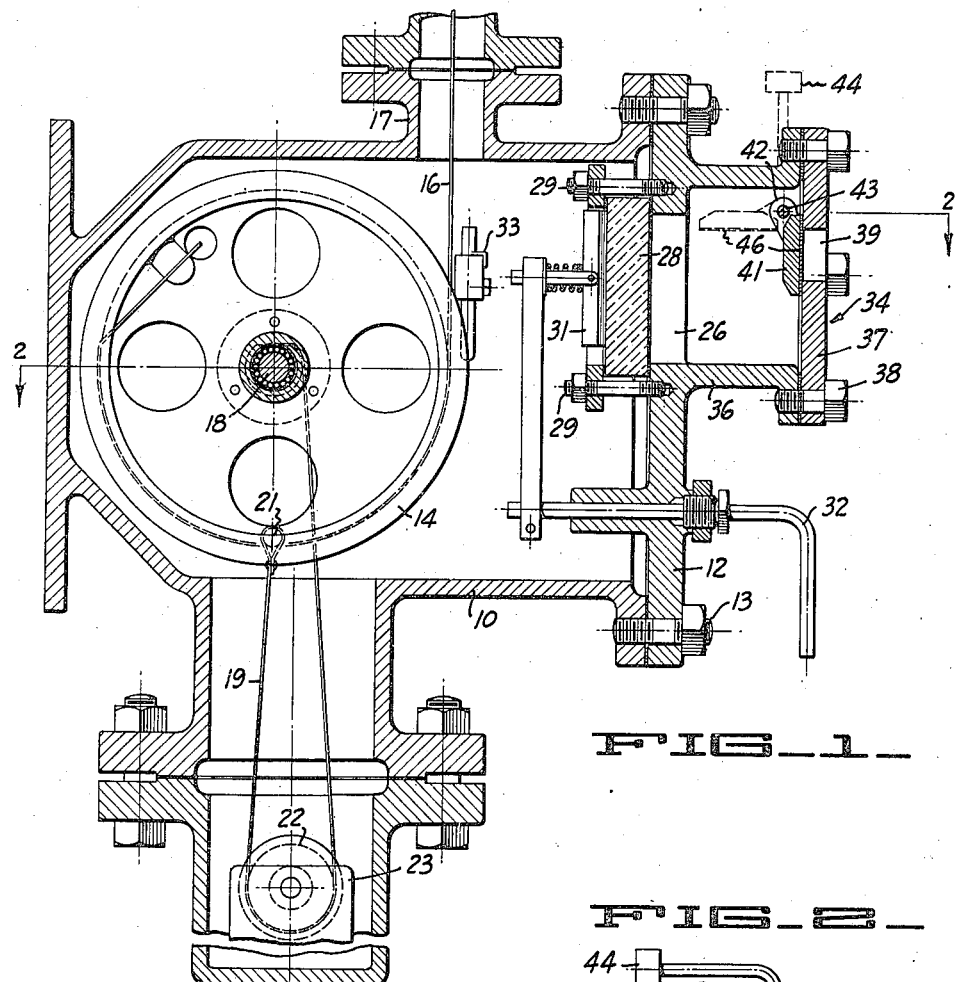
FIG_1_
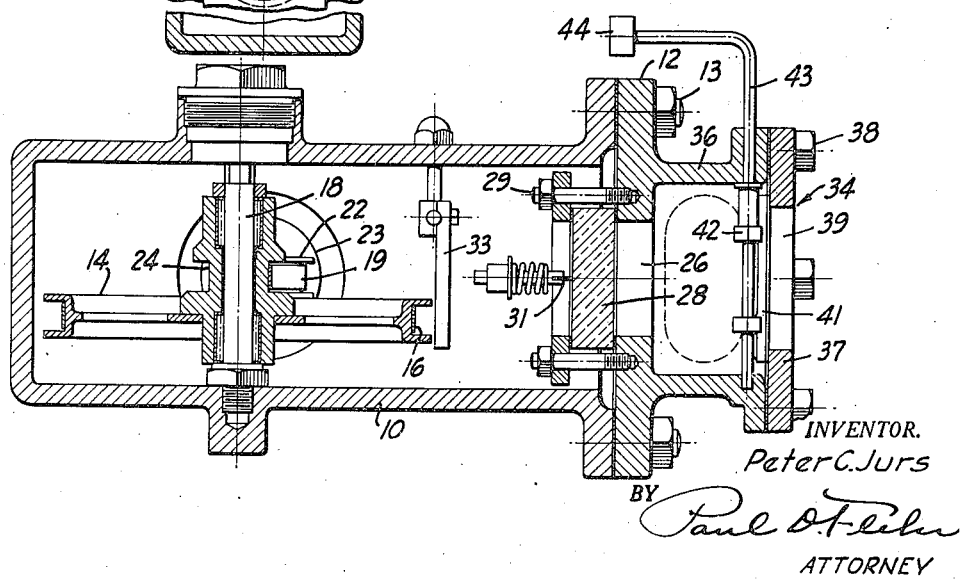
FIG_2_
INVENTOR.
Peter C. Jurs
BY
ATTORNEY Patented Apr. 5, 1949

2,466,437

UNITED STATES PATENT OFFICE 2,466,437

TANK GAUGE

Peter C. Jurs, Oakland, Calif., assignor to Shand & Jurs Company, Berkeley, Calif., a partnership Application November 3, 1945, Serial No. 626,474

1 Claim. (Cl. 73—321)

This invention relates generally to gauging equipment such as is employed in connection with various storage tanks.

In the petroleum and other industries it is frequently necessary to provide liquid level gauging equipment in conjunction with storage tanks which are maintained at pressures considerably above atmospheric. A conventional gauging equipment for such tanks makes use of an exterior housing connected with the interior of the tank through a conduit and equipped with gauging means such as a graduated metal tape and reel. A window is provided in one side wall of the housing through which an operator may view the tape during various gauging operations. It is not uncommon for the windows of such equipment to burst, either because of an external impact or because of inability to withstand the internal tank pressure. Any such breakage is a serious matter in that it involves a loss of vapor from the tank, as well as occasioning a serious fire hazard where the released vapors are inflammable, as is generally the case in the petroleum industry.

It is an object of the present invention to provide tank gauging equipment which prevents loss of vapor in the event of accidental breakage of the window through which the gauging means is viewed.

It is a further object of the invention to provide gauging apparatus of the above character which affords utmost safety in the operation of pressure tank gauging equipment, which can be readily manipulated by the operator, and which does not in any way interfere with the taking of gauge readings from gauging means such as a graduated tape.

Additional objects of the invention will appear from the following description in which the preferred embodiment has been set forth in detail in conjunction with the accompanying drawings.

Referring to the drawings—

Figure 1 is a side elevational view, in section, illustrating a tank gauging equipment incorporating the present invention.

Figure 2 is a view taken along the line 2—2 of Figure 1.

The tank gauging apparatus illustrated in the drawings consists generally of a housing 10 capable of withstanding the pressures with which the same is to be used. One side of the housing is enclosed by the plate 12, which is retained in place by studs 13.

As a representative of liquid gauging means I have shown a reel 14 upon which the graduated tape 16 is wound. The tape extends through closed piping, with which the pipe section 17 connects, and which generally extends to a connection through the roof of the tank.

The reel 14 is shown journaled upon a shaft 18 and is provided with suitable means to apply torque to the same intending to wind up the tape 16. For example in the embodiment illustrated there is a counterweight tape 19 having its one end anchored at 21, and engaged with the sheave 22 of the counterweight 23. The other end of the counterweight tape is anchored to and wound about the sheave portion 24, which is a part of the hub for the reel 14.

The wall or plate 12 is provided with an opening 26 which is normally covered and sealed by the window 28. The window is formed of suitable transparent material such as plate glass, and is retained in place upon the inner face of the wall 12 by suitable means such as clamping bolts 29. A suitable wiper 31, operated by exterior hand lever 32, can be provided for wiping off the inner surface of the window 28 in order to insure a clear view of the graduated tape 16. To facilitate accurate readings of the tape graduation a suitable pointer or straight edge 33 is provided.

Exterior of the opening 26 and the window 28, there is a secondary chamber 34 which can be formed for example by the annular wall section 36, which is welded or otherwise attached to the plate 12, together with the front closure wall 37, which is removably retained in place by the screws 38. The front wall 37 is provided with an opening 39 which is in line with window 28 and pointer 33, whereby an operator may sight through opening 39 to view the pointer and the tape graduations through the window 28.

Within the secondary chamber 34 a closure 41 is provided which normally closes or seals the opening 39. This closure is shown in the form of a flap having ears 42 which attach the same to the transverse shaft 43. The exterior portion of shaft 43 is provided with a hand lever 44 which is weighted as illustrated to serve as a counterweight. The weighting of lever 44 together with the weight of disc 41 is such that normally these parts occupy the position illustrated in Figure 1, with the closure member 41 extending across the opening 39. However upon manually swinging lever 44 to a raised position, member 41 is swung inwardly and upwardly to an out of the way position thereby permitting the operator to have an unobstructed view of the window 28. A suitable surfacing 46 can be provided for the exterior face of closure member 41 in order to more effectively seal upon the inner face of wall 37. For a reason which will be presently explained, it is desirable that this seal should not be perfect, but that a small amount of leakage be provided.

Operation of the apparatus described above can be explained as follows: It is assumed that apparatus is installed in connection with a tank having an internal pressure considerably above atmospheric. Normally when an operator desires to take gauge readings lever 44 is lifted to move the closure member 41 to an out of the way position, after which the operator has an unobstructed view through the window 28. Should the window 28 be accidentally broken, pressure within the housing 10 cannot escape but will be retained by the secondary chamber 34. If an operator attempts to take gauge readings without knowledge of the broken window 28, it will be found impossible to move the closure window 41 to an out of the way position due to the fluid pressure applied to the same. The operator will therefore be apprised of the fact that the window is broken, and no gauge readings will be attempted until the broken window has been repaired. Repair of the window involves shutting off communication between housing 10 and the tank, as by means of a valve installed in the piping connected to conduit 17, after which the plate 12 is removed and the broken window replaced.

If it should happen that there is merely a small amount of leakage about the window 28, such as tends to permit a small amount of vapor to escape into the secondary chamber 34, this will not prevent opening of the closure member 41 for taking gauge readings, because as previously pointed out a small amount of leakage is provided for the secondary chamber, thereby preventing a buildup of pressure within the secondary chamber to hinder manual movement of the closure member 41 to out of the way position.

Where light sensitive liquids, such as styrene, are being stored, my invention has an additional feature in that it prevents passage of light into the gauge housing, except for short intervals during which observations are being made.

It will be evident from the foregoing that my apparatus removes the hazards of prior apparatus of this character, and in general affords complete safety in event of accidental breakage of the viewing window. While the invention is particularly applicable to liquid level gauging, it can be used in conjunction with other tank gauging operations or for operations such as temperature checking and sampling.

I claim:

In a tank gauge or the like, a closed pressure resisting housing having means for connecting the same to a storage tank adapted to contain fluid under pressure, gauging means carried within the housing and adapted to be extended into the tank, a light permeable window in one wall of the housing and through which an operator may view the gauging means, a pressure resisting chamber enclosing the exterior of said window, one wall of said chamber being provided with a sight opening through which an operator may view the gauging means, a closure flap within said chamber and adapted to normally close said opening, means for pivotally supporting said flap whereby said flap may be swung from a normal closed position to a raised out-of-the-way position, and manually operable means exterior of said chamber for moving said flap to an out-of-the-way position and for urging said flap towards said normally closed position, said chamber and said flap serving to retain pressure within said housing in the event of accidental breakage of said window.

PETER C. JURS.

REFERENCES CITED

The following references are of record in the file of this patent:

UNITED STATES PATENTS

| Number | Name | Date |
|---|---|---|
| 1,723,454 | Wulff | Aug. 6, 1929 |
| 2,144,113 | Jurs | Jan. 17, 1939 |
| 2,217,579 | White | Oct. 8, 1940 |
| 2,262,182 | Huskamp | Nov. 11, 1941 |
| 2,348,007 | Hoke et al. | May 2, 1944 |
| 2,356,347 | Parsons | Aug. 22, 1944 |